United States Patent
Erhart et al.

(10) Patent No.: US 7,769,148 B2
(45) Date of Patent: Aug. 3, 2010

(54) FILLER VIDEO STREAMS IN INTERACTIVE VOICE RESPONSE SYSTEMS

(75) Inventors: George William Erhart, Loveland, CO (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 1381 days.

(21) Appl. No.: 11/208,876

(22) Filed: Aug. 22, 2005

(65) Prior Publication Data

US 2007/0041519 A1     Feb. 22, 2007

(51) Int. Cl.
*H04M 1/64*     (2006.01)
*G06F 15/16*    (2006.01)

(52) U.S. Cl. .................... 379/88.22; 709/218

(58) Field of Classification Search ... 379/88.01–88.04, 379/88.13, 88.18; 709/218
See application file for complete search history.

(56) References Cited

U.S. PATENT DOCUMENTS

| | | | |
|---|---|---|---|
| 5,737,393 A | 4/1998 | Wolf | |
| 6,587,822 B2 | 7/2003 | Brown et al. | |
| 7,007,074 B2* | 2/2006 | Radwin | 709/217 |
| 7,143,148 B1* | 11/2006 | Hickman et al. | 709/218 |
| 7,356,547 B2* | 4/2008 | Ozer et al. | 707/104.1 |
| 2003/0212558 A1 | 11/2003 | Matula | |
| 2004/0071275 A1 | 4/2004 | Bowater et al. | |
| 2004/0218737 A1 | 11/2004 | Kelly | |
| 2006/0156217 A1* | 7/2006 | Ertel et al. | 715/500.1 |

\* cited by examiner

*Primary Examiner*—Fan Tsang
*Assistant Examiner*—Solomon Bezuayehu
(74) *Attorney, Agent, or Firm*—DeMont & Breyer, LLC

(57) ABSTRACT

An apparatus and method are disclosed that enable an interactive voice response (IVR) system to select, tailor, and deliver a "filler" content stream to a calling telecommunications terminal during a delay in a call (e.g., when performing automated speech recognition, retrieving other content, etc.). The delivery of the filler content can reduce the chance that the caller terminates the call prematurely, and can also be used to provide information to the caller, advertise new products, etc. The filler content can be based on one or more of the following: the date and time, the identity of the caller, a prior call to the IVR system, the type of the calling telecommunications terminal, and a content stream that the IVR system is in the process of retrieving.

13 Claims, 5 Drawing Sheets

Figure 2 (PRIOR ART)

```
<?xml version="1.0"?>
<vxml version="2.0">
<menu id="menu1" scope="document" dtmf="true">
    <prompt> Welcome!!!! Please choose one of the following options: <enumerate/> </prompt>
        <choice dtmf="1" next="#formSales"> Sales, </choice>
        <choice dtmf="*2" next="#formMarket"> Marketing, </choice>
        <choice dtmf="3" next="#formSupport"> Support </choice>
</menu>
<form id="formSales">
    <field name="SalesInput">
        <prompt> I will now transfer you to sales </prompt>
    </field>
</form>
<form id="formMarket">
    <field name="MarketInput">
        <prompt> I will now transfer you to marketing </prompt>
    </field>
</form>
<form id="formSupport">
    <field name="SupportInput">
        <prompt> I will now transfer you to support </prompt>
    </field>
</form>
</vxml>
```

FILLER VIDEO STREAMS IN INTERACTIVE VOICE RESPONSE SYSTEMS

FIELD OF THE INVENTION

The present invention relates to telecommunications systems in general, and, more particularly, to delivering filler video streams to telecommunications terminals from an interactive voice response system.

BACKGROUND OF THE INVENTION

Many enterprises employ an interactive voice response (IVR) system that handles calls from telecommunications terminals. An interactive voice response system typically presents a hierarchy of menus to the caller, receives input keyed in by the caller, receives input spoken by the caller, and performs automated speech recognition (ASR) to interpret the spoken input. For example, a caller to an interactive voice response system might be presented with a menu of five options and might select the third option by pressing the "3" key of the terminal's keypad, or by saying the word "three." Similarly, a caller might specify his or her bank account number to the interactive voice response system by inputting the digits via the keypad, or by saying the digits. An interactive voice response system is also typically capable of issuing commands in response to a caller's input (e.g., retrieving a customer's records from a database, invoking a software application to process a bank account transaction, etc.), and of connecting the caller to a person in the enterprise.

FIG. 1 depicts telecommunications system 100 in accordance with the prior art. Telecommunications system 100 comprises telecommunications network 105, private branch exchange (PBX) 110, and interactive voice response system 120, interconnected as shown.

Telecommunications network 105 is a network such as the Public Switched Telephone Network [PSTN], the Internet, etc. that carries a call from a telecommunications terminal (e.g., a telephone, a personal digital assistant [PDA], etc.) to private branch exchange 110. A call might be a conventional voice telephone call, a text-based instant messaging (IM) session, a Voice over Internet Protocol (VOIP) call, etc.

Private branch exchange (PBX) 110 receives incoming calls from telecommunications network 105 and directs the calls to interactive voice response (IVR) system 120 or to one of a plurality of telecommunications terminals within the enterprise, depending on how private branch exchange 110 is programmed or configured. For example, in an enterprise call center, private branch exchange 110 might comprise logic for routing calls to service agents' terminals based on criteria such as how busy various service agents have been in a recent time interval, the telephone number called, and so forth. In addition, private branch exchange 110 might be programmed or configured so that an incoming call is initially routed to interactive voice response (IVR) system 120, and, based on caller input to IVR system 120, subsequently redirected back to PBX 110 for routing to an appropriate telecommunications terminal within the enterprise. Private branch exchange (PBX) 110 also receives outbound signals from telecommunications terminals within the enterprise and from interactive voice response (IVR) system 120, and transmits the signals on to telecommunications network 105 for delivery to a caller's terminal.

Interactive voice response (IVR) system 120 is a data-processing system that presents one or more menus to a caller and receives caller input (e.g., speech signals, keypad input, etc.), as described above, via private branch exchange 110. Interactive voice response system (IVR) 120 is typically programmable and performs its tasks by executing one or more instances of an IVR system application. An IVR system application typically comprises one or more scripts that specify what speech is generated by interactive voice response system 120, what input to collect from the caller, and what actions to take in response to caller input. For example, an IVR system application might comprise a top-level script that presents a main menu to the caller, and additional scripts that correspond to each of the menu options (e.g., a script for reviewing bank account balances, a script for making a transfer of funds between accounts, etc.).

A popular language for such scripts is the Voice extensible Markup Language (abbreviated VoiceXML or VXML). The Voice extensible Markup Language is an application of the extensible Markup Language, abbreviated XML, which enables the creation of customized tags for defining, transmitting, validating, and interpretation of data between two applications, organizations, etc. The Voice extensible Markup Language enables dialogs that feature synthesized speech, digitized audio, recognition of spoken and keyed input, recording of spoken input, and telephony. A primary objective of VXML is to bring the advantages of web-based development and content delivery to interactive voice response system applications.

FIG. 2 depicts an exemplary Voice extensible Markup Language (VXML) script (also known as a VXML document or page), in accordance with the prior art. The VXML script, when executed by interactive voice response system 120, presents a menu with three options; the first option is for transferring the call to the sales department, the second option is for transferring the call to the marketing department, and the third option is for transferring the call to the customer support department. Audio content (in particular, synthesized speech) that corresponds to text between the <prompt> and </prompt> tags is generated by interactive voice response system 120 and transmitted to the caller.

SUMMARY OF THE INVENTION

As video displays become ubiquitous in telecommunications terminals, it can be advantageous to deliver video content to a telecommunications terminal during a call with an interactive voice response (IVR) system, in addition to audio content. For example, a user of a telecommunications terminal who is ordering apparel via an interactive voice response system might receive a video content stream related to a particular item (e.g., depicting a model who is wearing the item, depicting the different available colors for the item, etc.). Furthermore, in some instances it might be desirable to deliver an audio content stream (e.g., music, news, soundtrack for a video stream, etc.) to the user, perhaps during silent periods in the call, or as background audio throughout the entire call, or during playback of a video stream, etc.

In some situations, when an interactive voice response system issues a command to initiate delivery of a content stream to a telecommunications terminal, there might be a significant delay before the telecommunications terminal starts receiving the content stream (e.g., due to retrieval and buffering of the content, etc.). Furthermore, other IVR system tasks during a call, such as performing automated speech recognition (ASR) or retrieving a VXML page, might cause delays. When a delay occurs during a call, the caller might prematurely terminate the call because of impatience, or because he or she mistakenly assumes that the interactive voice response system has "frozen." Such premature call terminations are undesirable because they can result in decreased customer satisfaction and lost sales.

In accordance with the illustrative embodiments of the present invention, when there is a delay during a call (e.g., due to retrieval and buffering of a content stream, etc.), the interactive voice response system will stream "filler" content to the caller during the delay. The filler content, which typically is relatively short in duration, is stored so that it can be rapidly retrieved and streamed to the calling terminal (e.g., in a cache, on a local disk, in a random access memory that enables concurrent reads, etc.). The streaming of filler content during a delay can reduce the chance that a caller prematurely terminates a call, and can also be used to provide information (e.g., weather, news, stock quotes, etc.), advertise products, and so forth.

In the illustrative embodiments of the present invention, filler content that is streamed to the caller can be based on one or more of the following: the date and time (i.e., the "calendrical time"); the identity of the caller; a prior call to the IVR system by the caller; the type of the calling telecommunications terminal; and the content stream that is being retrieved by the IVR system and is causing the delay. This enables the interactive voice response system to select and tailor filler content, including any superimposed graphics, advantageously. For example:

An advertisement that is presumably of interest to a particular caller might be selected as the filler content.

An animated graphic that depicts the current date and time and the current value of the Dow Jones® stock market index might be overlaid at the bottom of a filler video stream.

A high-resolution version of a filler video stream might be delivered to a telecommunications terminal that has a large display.

A low-resolution version of a filler video stream might be delivered when network performance is poor.

The soundtrack portion of a filler video stream might be delivered to a terminal that has no display.

A graphic timer or progress bar that is overlaid at the bottom of a filler video stream might indicate one or more of: the elapsed time since the filler content stream started; the time remaining in the filler content stream; and the estimated time remaining until the original, "non-filler" content stream begins.

The filler content might be a video "trailer" for the non-filler content stream.

An advertisement might be selected based on an item that was purchased by the caller during a prior call to the interactive voice response system.

The illustrated embodiments comprise: issuing a first command for initiating delivery of a first content stream to a telecommunications terminal during a call that involves the telecommunications terminal and an interactive voice response system; and issuing a second command for initiating delivery of a second content stream to the telecommunications terminal before the delivery of the first content stream is initiated.

BRIEF DESCRIPTION OF THE DRAWINGS

FIG. 2 depicts a block diagram of the salient elements an exemplary Voice extensible Markup Language (VXML) script, in accordance with the prior art.

DETAILED DESCRIPTION

The terms appearing below are given the following definitions for use in this Description and the appended claims.

For the purposes of the specification and Claims, the term "calendrical time" is defined as indicative of one or more of the following:

(i) a time (e.g., 16:23:58, etc.), (ii) one or more temporal designations (e.g., Tuesday, November, etc.), (iii) one or more events (e.g., Thanksgiving, John's birthday, etc.), and (iv) a time span (e.g., 8:00 PM to 9:00 PM, etc.).

Figure 1:
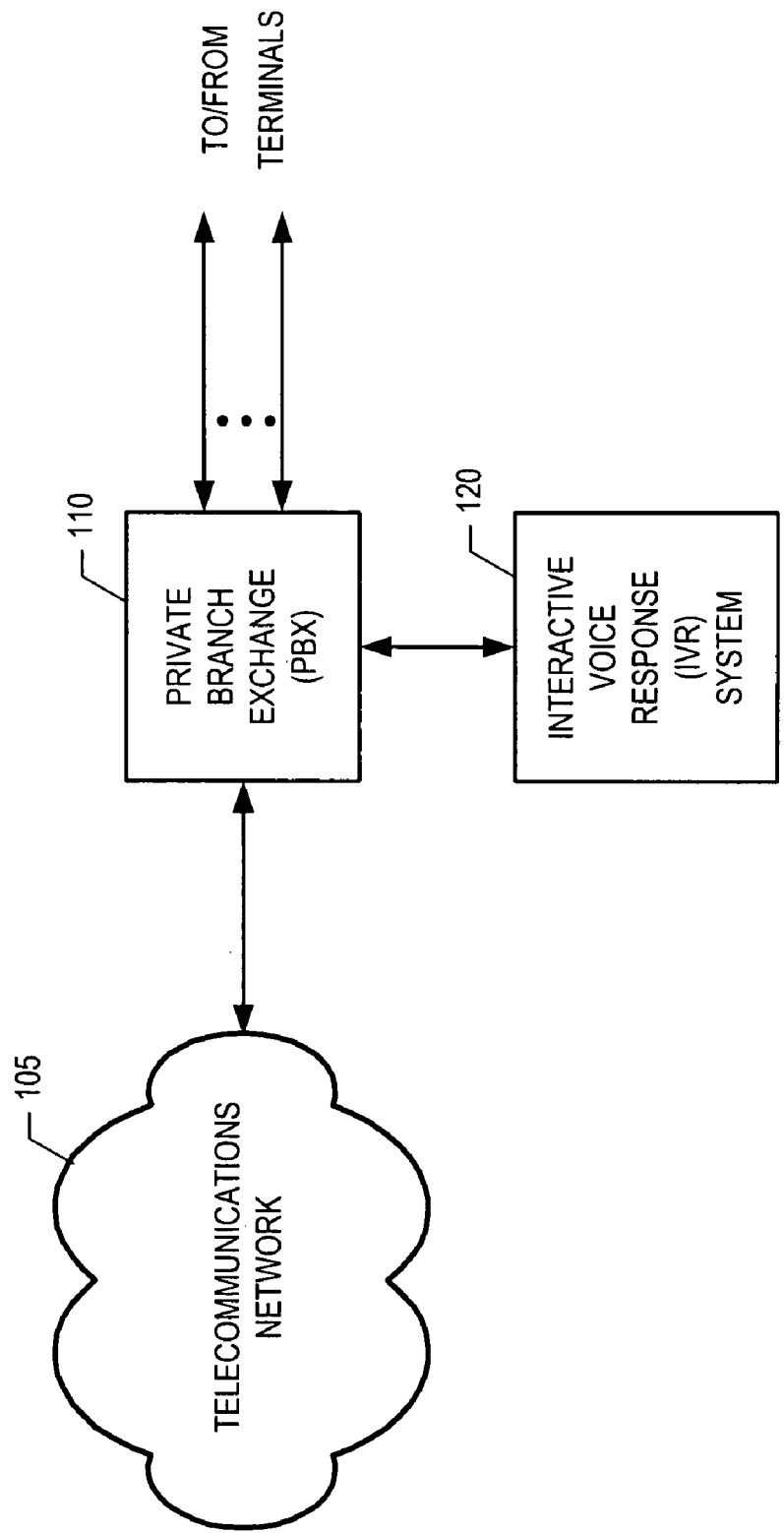
FIG. 1 depicts a telecommunications system in accordance with the prior art.
Figure 3:
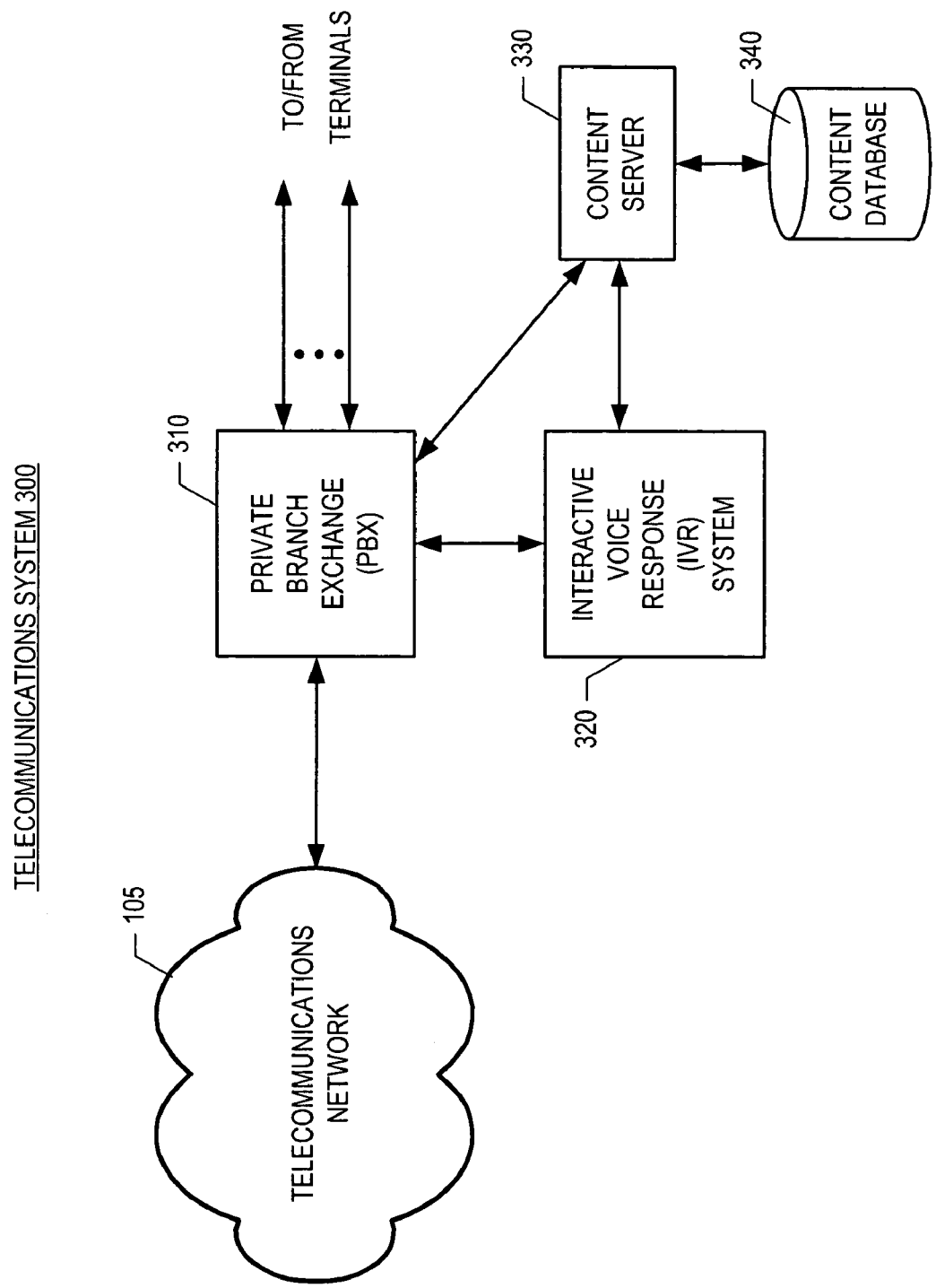
FIG. 3 depicts a telecommunications system in accordance with the illustrative embodiments of the present invention.

FIG. 3 depicts telecommunications system 300 in accordance with the illustrative embodiments of the present invention. Telecommunications system 300 comprises telecommunications network 105, private branch exchange (PBX) 310, interactive voice response system 320, content server 330, and content database 340, interconnected as shown.

Private branch exchange (PBX) 310 provides all the functionality of private branch exchange (PBX) 110 of the prior art, and is also capable of receiving streamed content (e.g., audio, video, multimedia, etc.) from content server 330, of forwarding streamed content on to telecommunications network 105 for delivery to a caller's terminal, and of transmitting signals related to streamed content to content server 330. Furthermore, in addition to conventional telephony-based signaling and voice signals, private branch exchange 310 is also capable of transmitting and receiving Internet Protocol (IP) data packets, Session Initiation Protocol (SIP) messages, Voice over IP (VOIP) traffic, and stream-related messages (e.g., Real Time Streaming Protocol [RTSP] messages, etc.) to and from IVR system 320. It will be clear to those skilled in the art, after reading this specification, how to make and use private branch exchange (PBX) 310.

Interactive voice response system 320 provides all the functionality of interactive voice response system 120 of the prior art, and is also capable of transmitting commands to content server 330 (e.g., starting playback of a content stream, stopping playback of the content stream, queueing another content stream, etc.) and of receiving information from content server 330 (e.g., an indication that playback of a content stream has begun, an indication that playback of a content stream has completed, etc.). It will be clear to those skilled in the art, after reading this specification, how to make and use interactive voice response system 320.

Content server 330 is capable of retrieving content from content database 340, of buffering and delivering a content stream to a calling terminal via private branch exchange 310, of receiving commands from interactive voice response (IVR) system 310 (e.g., to start playback of a content stream, to queue another content stream, etc.), and of transmitting status information to interactive voice response (IVR) system 310, in well-known fashion. It will be clear to those skilled in the art, after reading this specification, how to make and use content server 330.

Content database 340 is capable of storing a plurality of multimedia content (e.g., video content, audio content, etc.) and of retrieving content in response to commands from content server 330, in well-known fashion. It will be clear to those skilled in the art, after reading this specification, how to make and use content database 340.

Figure 4:
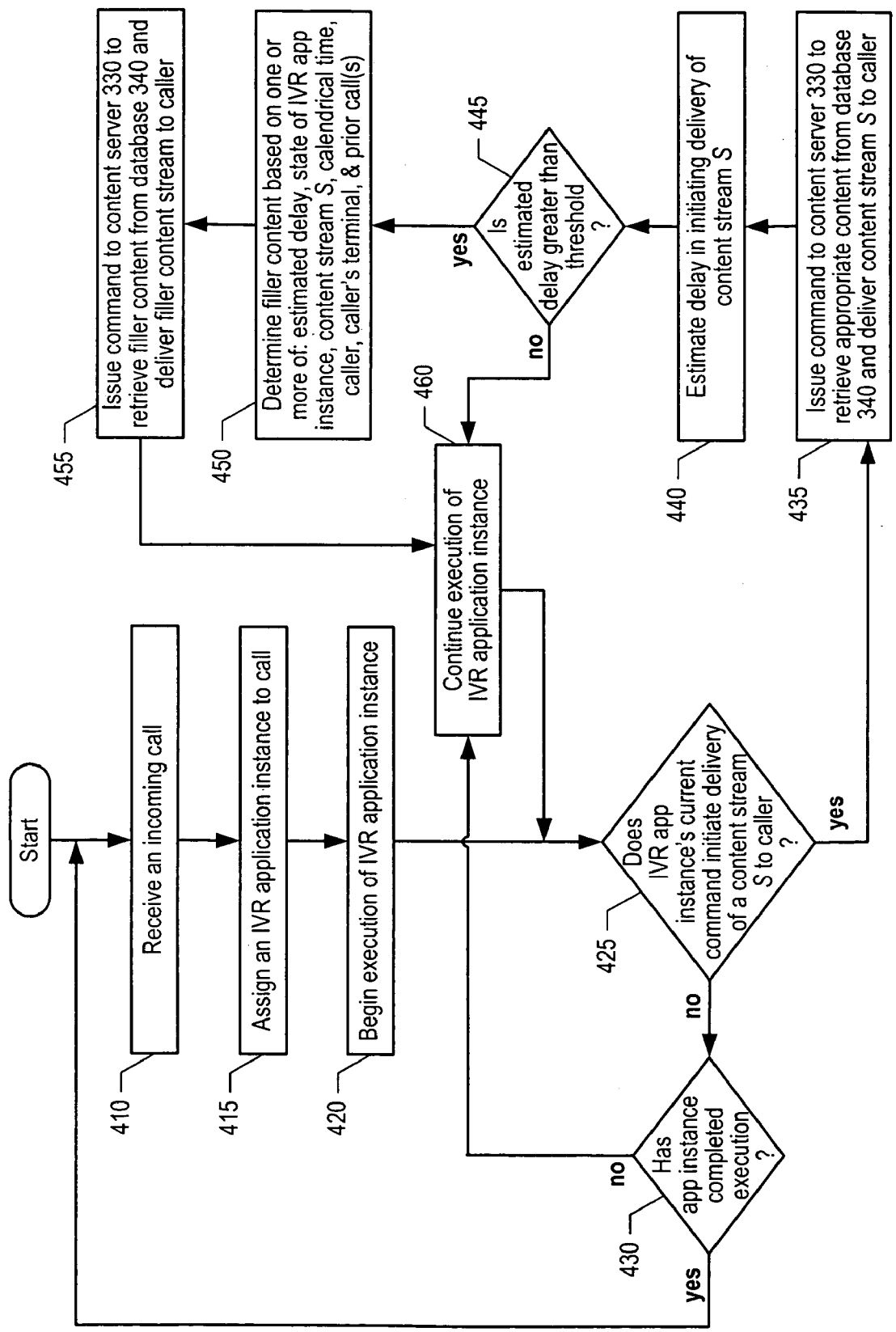
FIG. 4 depicts a flowchart of the salient tasks of interactive voice response system 320, in accordance with the first illustrative embodiment of the present invention.

FIG. 4 depicts a flowchart of the salient tasks of interactive voice response (IVR) system 320, in accordance with the first illustrative embodiment of the present invention. It will be clear to those skilled in the art which tasks depicted in FIG. 4 can be performed simultaneously or in a different order than that depicted.

At task 410, an incoming call is received at interactive voice response (IVR) system 320, in well-known fashion.

At task 415, interactive voice response (IVR) system 320 assigns an instance of an appropriate IVR system application to the incoming call, in well-known fashion. As will be appreciated by those skilled in the art, although in the illustrative embodiments an instance of an IVR system application handles one incoming call at a time, in some other embodiments of the present invention an application instance might handle a plurality of calls concurrently.

At task 420, interactive voice response (IVR) system 320 begins executing the IVR application instance, in well-known fashion.

At task 425, interactive voice response (IVR) system 320 checks whether the current command to be executed in the IVR application instance initiates delivery of a content stream S to the calling telecommunications terminal. If so, IVR system 320's execution of the method of FIG. 4 continues at task 435; otherwise, IVR system 320's execution of the method of FIG. 4 proceeds to task 430.

At task 430, interactive voice response (IVR) system 320 checks whether the IVR application instance's execution has completed. If so, IVR system 320's execution of the method of FIG. 4 continues back at task 410 for the next incoming call; otherwise, IVR system 320's execution of the method of FIG. 4 proceeds to task 460.

At task 435, interactive voice response (IVR) system 320 issues a command to content server 330 to retrieve content from database 340 and deliver the content to the calling telecommunications terminal in streaming fashion, as is well-known in the art. As will be appreciated by those skilled in the art, in some embodiments of the present invention, the command to deliver content might result in the stopping of a currently-playing stream (e.g., filler content, etc.). as soon as the content is ready to be streamed to the terminal, while in some other embodiments, streaming of the retrieved content does not begin until the currently-playing stream has finished.

At task 440, interactive voice response (IVR) system 320 estimates the delay in initiating delivery of content stream S to the calling telecommunications terminal. As will be appreciated by those skilled in the art, There are a variety of methods for estimating performance (and equivalently, delays) that are well-known in the art; such methods take into account a variety of factors including bus/network performance, probabilistic caller patterns, concurrency, storage system performance, and so forth.

At task 445, interactive voice response (IVR) system 320 checks whether the estimated delay exceeds a particular threshold. As will be appreciated by those skilled in the art, the value of the threshold might be selected based on empirical observations of caller behavior, customer surveys, intuition, and so forth. If the estimated delay exceeds the threshold, IVR system 320's execution of the method of FIG. 4 proceeds to task 445; otherwise, IVR system 320's execution of the method of FIG. 4 continues at task 460.

At task 450, interactive voice response (IVR) system 320 determines the filler content to be delivered to the calling telecommunications terminal during the delay in retrieving content stream S and initiating delivery of content stream S to the terminal. IVR system 320 determines the filler content based on one or more of the following: the estimated delay; the state of the IVR application instance (i.e., the current VXML page, the values of variables and registers, etc.); content stream S; the calendrical time; the identity of the caller; the type of the caller's terminal (e.g., in order to determine the terminal's display capability, bandwidth capability, etc.); and one or more prior calls involving the caller and IVR system 320.

At task 455, interactive voice response (IVR) system 320 issues a command to content server 330 to retrieve the filler content from database 340 and deliver the filler content to the calling telecommunications terminal in streaming fashion, as is well-known in the art. As will be appreciated by those skilled in the art, it is advantageous to store the filler content in a memory from which it can be rapidly retrieved and streamed to the calling terminal (e.g., in a cache, on a local disk, in a random access memory that enables concurrent reads, etc.). Otherwise, retrieval of the filler content might cause an appreciable delay, which is the very problem that the filler content is intended to solve. As will further be appreciated by those skilled in the art, in some embodiments of the present invention, the command to deliver the filler content might specify one of the following:

Playback of the filler content should be looped until a requested content stream (e.g., stream content stream S, etc.) is ready to be delivered.

The filler content should be played at most once. When a requested content stream (e.g., stream content stream S, etc.) is ready to be delivered and the filler content is currently being played, playback of the filler content is stopped and playback of the requested content stream is begun.

The filler content should be played once. When a requested content stream (e.g., stream content stream S, etc.) is ready to be delivered and the filler content is currently being played, playback of the requested content stream is not begun until playback of the filler content has completed.

At task 460, interactive voice response (IVR) system 320 continues the execution of the IVR application instance, in well-known fashion. After task 460, IVR system 320's execution of the method of FIG. 4 continues back at task 425.

As will be appreciated by those skilled in the art, although the delay in the method of FIG. 4 is caused by the retrieval of content stream S (i.e., task 435), the method of FIG. 4 can be employed for other kinds of delays in interactive voice response system 320 (e.g., delays due to automated speech recognition (ASR), delays in retrieving a VXML page, etc.).

Figure 5:
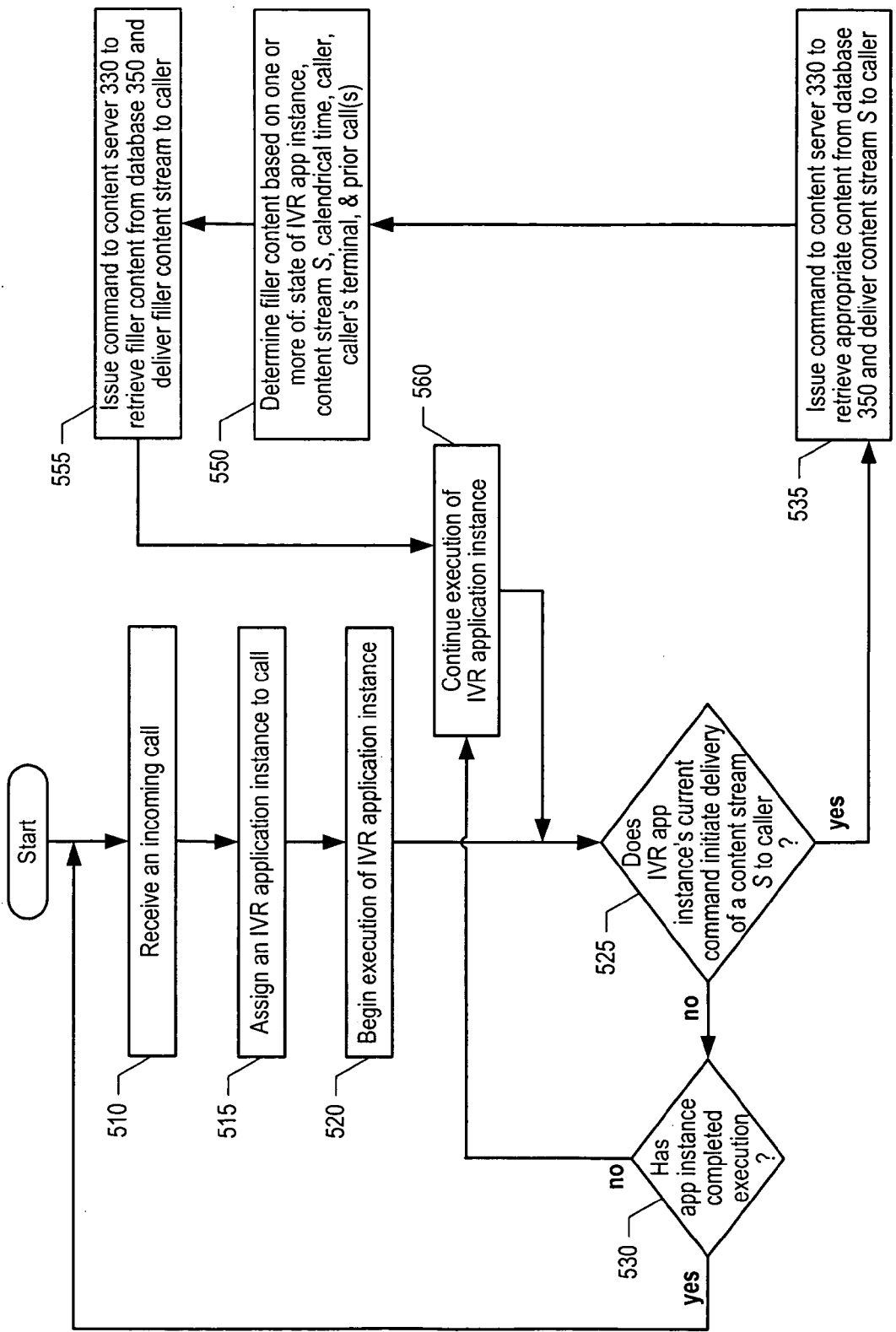
FIG. 5 depicts a flowchart of the salient tasks of interactive voice response system 320, in accordance with the second illustrative embodiment of the present invention.

FIG. 5 depicts a flowchart of the salient tasks of interactive voice response (IVR) system 320, in accordance with the second illustrative embodiment of the present invention. It will be clear to those skilled in the art which tasks depicted in FIG. 5 can be performed simultaneously or in a different order than that depicted.

The method of FIG. 5 is similar to the method of FIG. 4, with the exception that the method of FIG. 5 does not estimate the delay in initiating delivery of content stream S and compare this estimate to a threshold (tasks 440 and 445); rather, filler content is always played.

Tasks 510, 515, 520, 525, 530, 535, 555, and 560 of FIG. 5 are the same as tasks 410, 415, 420, 425, 430, 435, 455, and 460 of FIG. 4, respectively.

Task 550 is similar to task 450, except that in task 550, the determination of the filler content is not based on an estimated delay.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    issuing a first command for initiating delivery of a first content stream to a telecommunications terminal during a call that involves said telecommunications terminal and an interactive voice response system;
    estimating a time delay between the issuing of said first command and the initiation of delivery of said first content stream; and
    when the estimated time delay exceeds a threshold, issuing a second command for initiating delivery of a second content stream to said telecommunications terminal before the delivery of said first content stream is initiated;
    wherein an estimated time delay between the issuing of said second command and the initiation of delivery of said second content stream is less than the estimated time delay between the issuing of said first command and the initiation of delivery of said first content stream.

2. The method of claim 1 further comprising delivering said first content stream to said telecommunications terminal after the delivery of said second content stream is complete.

3. The method of claim 1 further comprising:
    stopping the delivery of said second content stream; and
    delivering said first content stream to said telecommunications terminal after the stopping of said second content stream.

4. The method of claim 1 wherein the estimated time delay between the issuing of said second command and the initiation of delivery of said second content stream is also less than said threshold.

5. The method of claim 1 wherein said time delay between the issuing of said first command and the initiation of delivery of said first content stream is due to the retrieval of some or all of said first content stream.

6. The method of claim 1 wherein said second content stream is based on the calendrical time.

7. The method of claim 1 wherein said second content stream is based on said first content stream.

8. The method of claim 1 wherein said second content stream is based on the identity of the user of said telecommunications terminal.

9. The method of claim 8 wherein said second content stream is also based on a third content stream that was previously delivered to the user of said telecommunications terminal.

10. A method comprising:
    issuing a first command in an application of an interactive voice response system, wherein said application is for handling a call that involves said interactive voice response system and a telecommunications terminal, and wherein said first command is for initiating delivery of a first content stream to said telecommunications terminal during said call; and
    when an estimate of the time delay between the issuing of said first command and the initiation of delivery of said first content stream exceeds a threshold, issuing a second command in said application for initiating delivery of a second content stream to said telecommunications terminal before the delivery of said first content stream is initiated;
    wherein said second content stream is based on a state of said application; and
    wherein an estimated time delay between the issuing of said second command and the initiation of delivery of said second content stream is less than the estimated time delay between the issuing of said first command and the initiation of delivery of said first content stream.

11. The method of claim 10 wherein said second content stream is also based on the calendrical time.

12. The method of claim 10 wherein said second content stream is also based on said first content stream.

13. The method of claim 10 wherein said second content stream is also based on the identity of the user of said telecommunications terminal.

* * * * *